United States Patent
Lin

[19]

[11] Patent Number: 6,135,668
[45] Date of Patent: Oct. 24, 2000

[54] PIVOTABLE DEVICE FOR CONNECTING TWO PARTS OF A BICYCLE

[75] Inventor: Chin-Wang Lin, Young-Kang, Taiwan

[73] Assignee: Sheang Lih Cycle Limited, Tainan Hsien, Taiwan

[21] Appl. No.: 09/299,613

[22] Filed: Apr. 27, 1999

[51] Int. Cl.[7] ................................................. F16B 21/00
[52] U.S. Cl. ................ 403/322.4; 403/102; 403/324; 280/278; 280/287; 74/551.1; 74/551.3
[58] Field of Search ............................. 403/102, 322.4, 403/324; 280/278, 287; 74/551.1, 551.3

[56] References Cited

U.S. PATENT DOCUMENTS

| | | | |
|---|---|---|---|
| 3,722,913 | 3/1973 | Housayama | 280/287 |
| 3,979,136 | 9/1976 | Lassiere | 280/278 |
| 4,284,288 | 8/1981 | Fulton | 280/278 |
| 4,440,414 | 4/1984 | Wang | 403/324 X |
| 4,611,818 | 9/1986 | Cammarata | 280/278 |
| 5,052,706 | 10/1991 | Tsai et al. | 280/287 |
| 5,149,119 | 9/1992 | Hwang | 280/287 X |
| 5,301,972 | 4/1994 | Lee | 280/278 |
| 5,337,609 | 8/1994 | Hsu | 74/551.3 |
| 5,398,955 | 3/1995 | Yeh | 280/287 |
| 5,409,321 | 4/1995 | Chen | 403/321 |
| 5,440,948 | 8/1995 | Cheng | 403/322 |
| 5,492,350 | 2/1996 | Pan | 403/322 X |
| 5,716,065 | 2/1998 | Liu | 280/278 X |
| 5,794,958 | 8/1998 | Hsiao | 280/287 |
| 5,836,602 | 11/1998 | Wang | 280/287 |
| 5,865,560 | 2/1999 | Mercat et al. | 403/322.4 |
| 5,906,452 | 5/1999 | Lee | 280/278 X |

*Primary Examiner*—Lynne H. Browne
*Assistant Examiner*—Danielle Somrak
*Attorney, Agent, or Firm*—Rosenberg, Klein & Lee

[57] ABSTRACT

A pivotal device for connected two parts of a foldable bicycle includes two boards each are connected to a part of the bicycle and are pivotally connected with each other. A clutch device is connected between the two boards and includes two pins extending through the two side plates of each of the two boards. Each of the pins are movable to disengage from one of the two boards to allow the two boards to be pivoted away from each other. A secure device is connected to the clutch device so as to secure the pins of the clutch device in position such that the two boards are not pivoted away from each other.

11 Claims, 8 Drawing Sheets

PIVOTABLE DEVICE FOR CONNECTING TWO PARTS OF A BICYCLE

FIELD OF THE INVENTION

The present invention relates to a pivotable device for connecting two parts of a foldable bicycle. The device includes two boards pivotably connected with each other with a clutch means connected between the two boards and a secure means connected to the clutch means to securely connect the two boards.

BACKGROUND OF THE INVENTION

A conventional foldable bicycle as shown in FIG. 8 adopts two plates (90), (91) to respectively connected two tubes (96, 97) of the frame of the bicycle, the two plates (90, 91) are pivotally connected with each other. The plate (90) has two rings (901) extending form one of two ends thereof and a bolt (93) has the head (931) thereof retained between the two rings (901). A quick release bar (95) has its actuating portion (951) rotatably inserted through the two rings (901) and the hole (930) defined through the head (931) so that when rotating the quick releaser bar (95), the bolt (93) is rotated toward the plate (91). The plate (91) has a notch (911) defined in one of two ends thereof so that the shank portion (932) of the bolt (93) is engaged with the notch (911) to let the two tubes (96, 97) be located in alignment with each other. The shank portion (932) is engaged with a nut (94) to fixedly position the bolt (93) relative to the plate (91). By the device, the bicycle frame can be folded. However, The notch (911) is an open notch and the shank portion (932) in the notch (911) is simply clamped by the nut (94) so that the shank portion (932) could disengage from the notch (911) if an unexpected impact is happened to the shank portion (932). This will result in a dangerous disaster.

The present invention intends to provide a pivotable device for pivotably connecting two parts of a foldable bicycle. The device has a clutch means and a secure means to ensure the two parts will not disengaged from each other so that the present invention mitigates the disadvantages of the conventional pivotable device for connecting two parts of a foldable bicycle.

SUMMARY OF THE INVENTION

In accordance with one aspect of the present invention, a pivotable device for connecting two parts of a foldable bicycle is provided and comprises a first board having two first side plates and connected to a part of a foldable bicycle. Each first side plate has a slot defined therethrough and a pushing member movably extends through each first side plate. A first hole is defined through the first board.

A second board has two second side plates and is connected to another part of a foldable bicycle. Each second side plate has a second hole and a notch respectively defined therein. The first board and the second board are pivotally connected with each other at one of two ends thereof. A clutch means is connected between the first board and the second board, and the clutch means includes a block with two tubular members extending from two ends of the block. Each tubular member has a spring and a pin movable received therein, and each pin extends through the slot and the second hole corresponding thereto. The two pushing members contact the two pins. The inner diameter of each slot is larger than the outer diameter of each tubular member.

A secure means has a rod extending through the first hole of the first board and the first end of the rod is fixedly connected to the block. The second end of the rod is fixedly connected a transverse bar and a cam member is fixedly connected to the transverse bar.

The primary object of the present invention is to provide a pivotal device for connecting two parts of a foldable bicycle, wherein a clutch means allows the two board to be pivoted away from or toward each other.

Another object of the present invention is to provide a pivotal device for connecting two parts of a foldable bicycle, wherein a secure means secures the clutch means not to be unintentionally released.

Further objects, advantages, and features of the present invention will become apparent from the following detailed description with appropriate reference to the accompanying drawings.

DETAILED DESCRIPTION OF THE PREFERRED EMBODIMENT

Figure 1:
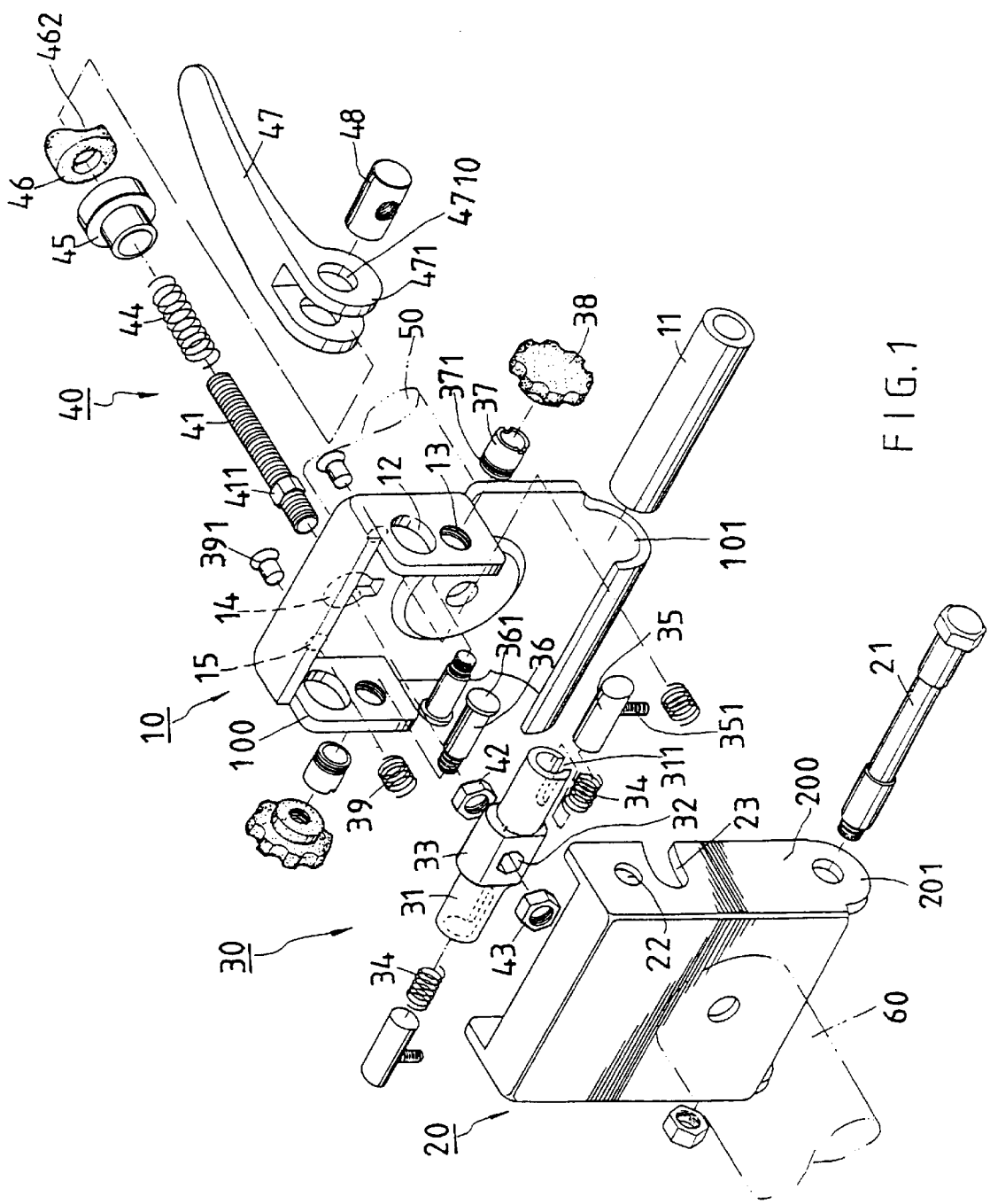
FIG. 1 is an exploded view of the pivotal device in accordance with the present invention.
Figure 2:
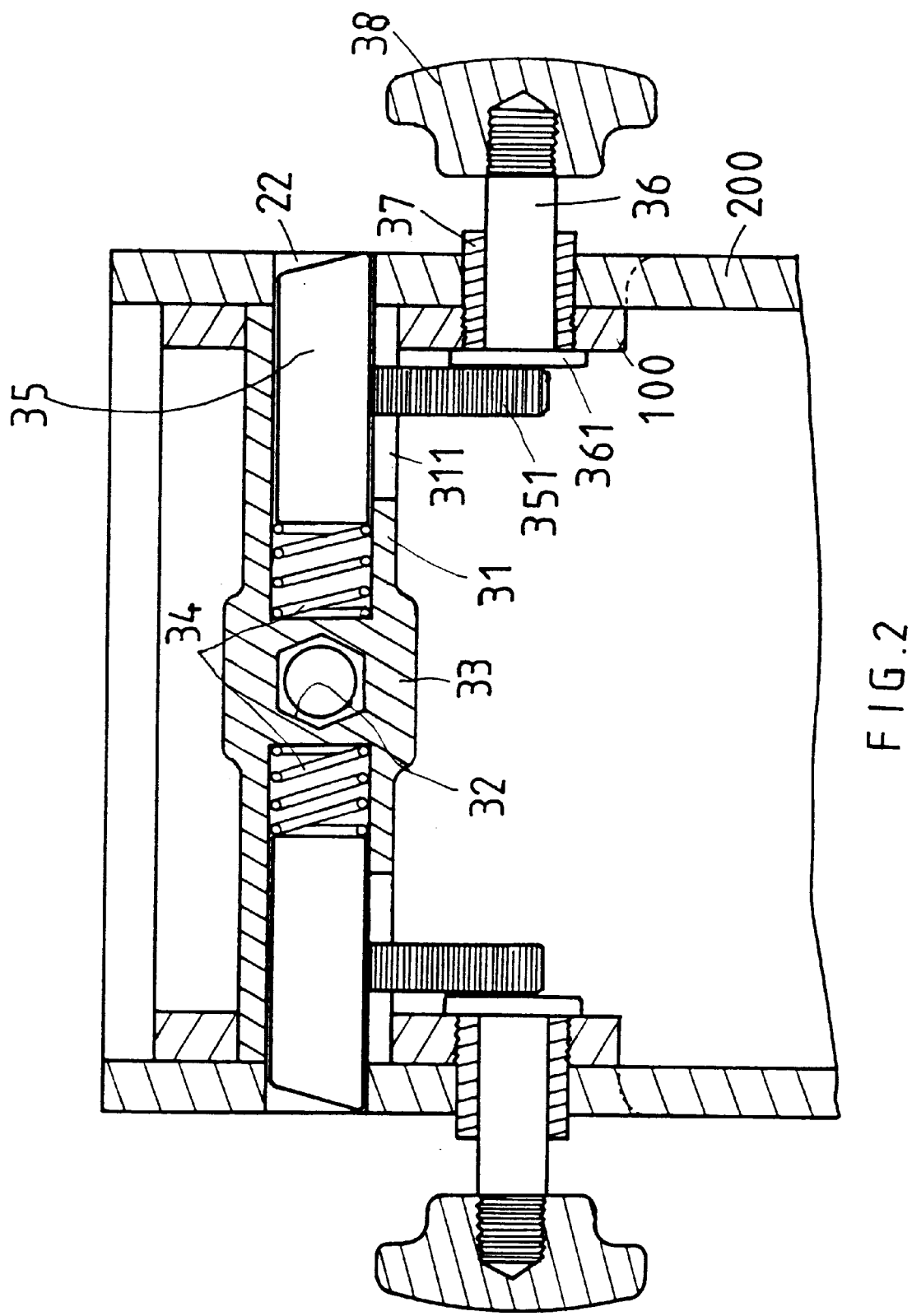
FIG. 2 is a side elevational view, partly in section, of the pivotal device in accordance with the present invention wherein the two pins are not yet moved.
Figure 5:
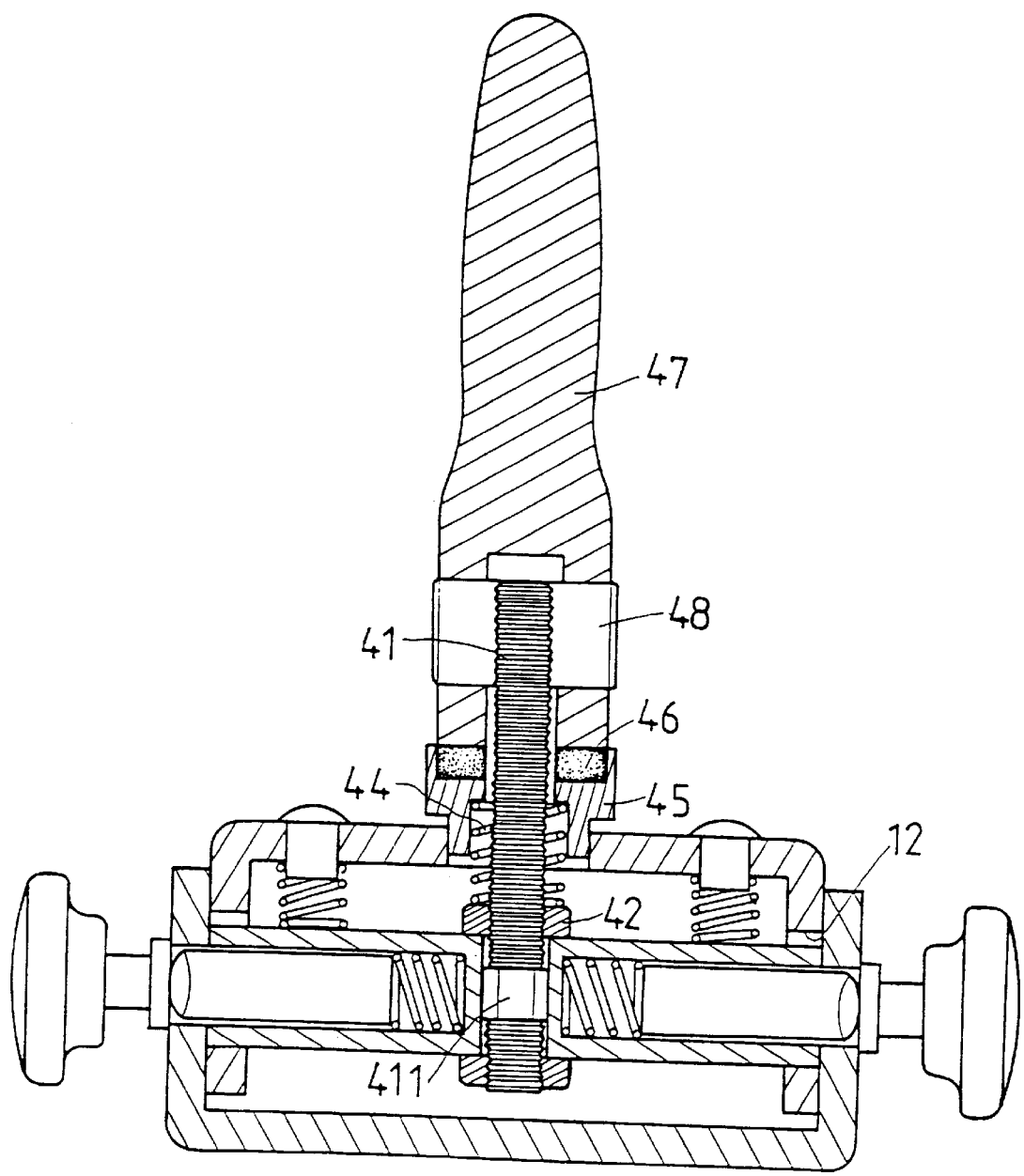
FIG. 5 is a side elevational view, partly in section, of the pivotal device in accordance with the present invention wherein the cam member is not yet pushed.

Referring to FIGS. 1, 2 and 5, the pivotable device for connecting two parts 50, 60 of a foldable bicycle comprises a first board (10), a second board (20) which is pivotably connected to the first board (10) at one of two ends thereof. The first board (10) has two first side plates (100) extending from two sides thereof and the first board (10) is connected to the part (50) of a foldable bicycle. Each first side plate (100) has a slot (12) and a threaded hole (13) respectively defined therethrough. Each threaded hole (13) has a socket (37) threadedly connected thereto and each socket (37) has a pushing member (36) movably extending therethrough. Each pushing member (36) has the first end thereof a disk (361) connected thereto which is located between the two first side plates (100). The second end of each pushing member (36) is connected to a knob (38) which is located on the outside of the first side wall (100) corresponding thereto. A first hole (14) and two apertures (15) are respectively defined through the first board (10).

Figure 7:
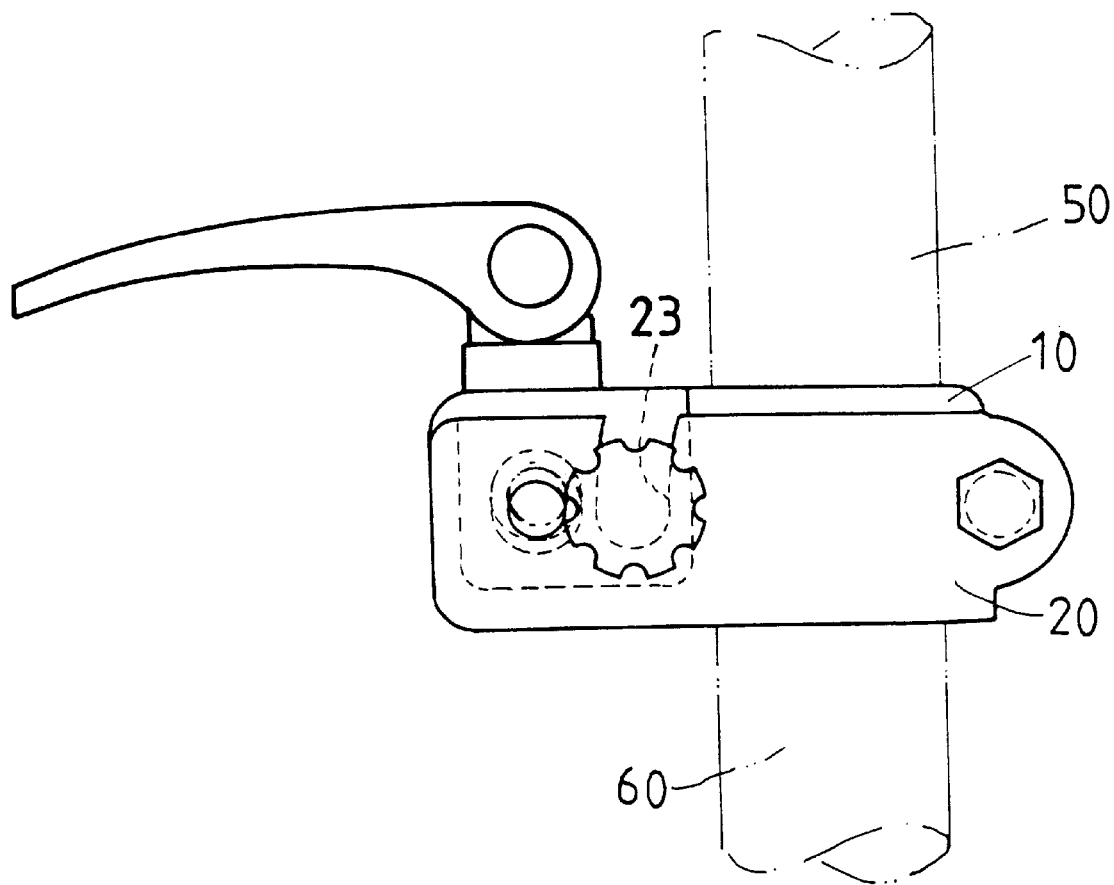
FIG. 7 is an illustrative view to illustrate the first board and the second board are pivoted toward with each other.
Figure 8:
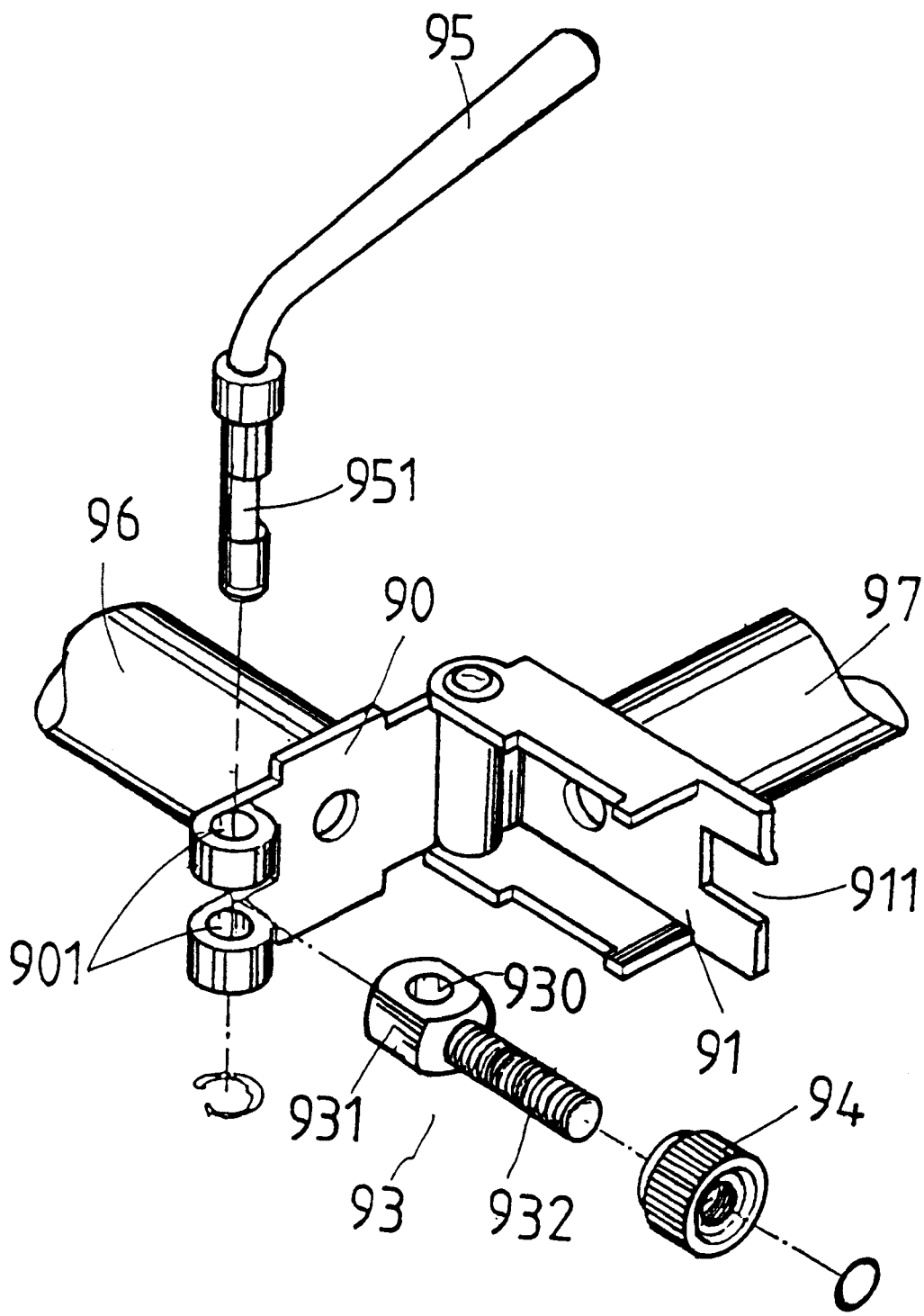
FIG. 8 is an exploded view of the conventional pivotal device for a foldable bicycle.

The second board (20) has two second side plates (200) extending from two sides thereof and the second board (20) is connected to another part (60) of a foldable bicycle. Each second side plate (200) has a second hole (22) and a notch (23) respectively defined therein, wherein the notches (23)

are to receive the sockets (37) in which the pushing members (36) are received when the first board (10) and the second board (20) are connected together as shown in FIG. 7.

It is to be noted that the first board (10) has a curved plate (101) connected to the first end thereof and a tube (11) is received in the curved plate (101). The second board (20) has two lugs (201) extending from the two second side plates (200) so that the tube (11) is located between the two lugs (201). An axle (21) extends through the two lugs (201) and the tube (11) so that the first board (10) and the second board (20) are pivotably connected with each other.

A clutch means (30) is connected between the first board (10) and the second board (20). The clutch means (30) includes a block (33) with two tubular members (31) extending from two ends of the block (33). The block (33) has a hexagonal passage (32) defined therethrough. Each tubular member (31) has a spring (34) and a pin (35) is movable received therein. Each pin (35) extends through the slot (12) and the second hole (22) corresponding thereto. Each tubular member (31) has a slit (311) defined through the wall thereof and each pin (35) has a leg (351) extending radially outward therefrom. Each leg (351) extends through the slit (311) corresponding thereto and contacts the disk (361) of the pushing member (36) corresponding thereto. The inner diameter of each slot (12) is larger than the outer diameter of each tubular member (31). Each aperture (15) has a pin member (391) engaged therein and each pin member (391) has a spring (39) mounted thereto so as to contact the tubular member (31) corresponding thereto.

A secure means (40) has a threaded rod (41) extending through the first hole (14) of the first board (10) and the first end of the rod (41) having a threaded periphery extends through the hexagonal passage (32) and is engaged with a nut (42). The second end of the rod (41) is fixedly connected a transverse bar (48). The threaded rod (41) has a hexagonal flange (411) extending radially outward therefrom so as to be securely retained in the hexagonal passage (32). Another nut (42) is threadedly mounted to the threaded rod (41) and a collar (45) and a frame (46) are respectively mounted to the threaded rod (41). A spring (44) is biased between the collar (45) and the nut (42). A cam member (47) which is a longitudinal member and has two lugs (471) extending from one of two ends thereof. Each lug (471) has an eccentric hole (4710) defined therethrough and the transverse bar (48) extends through the two eccentric hole (4710).

Figure 3:
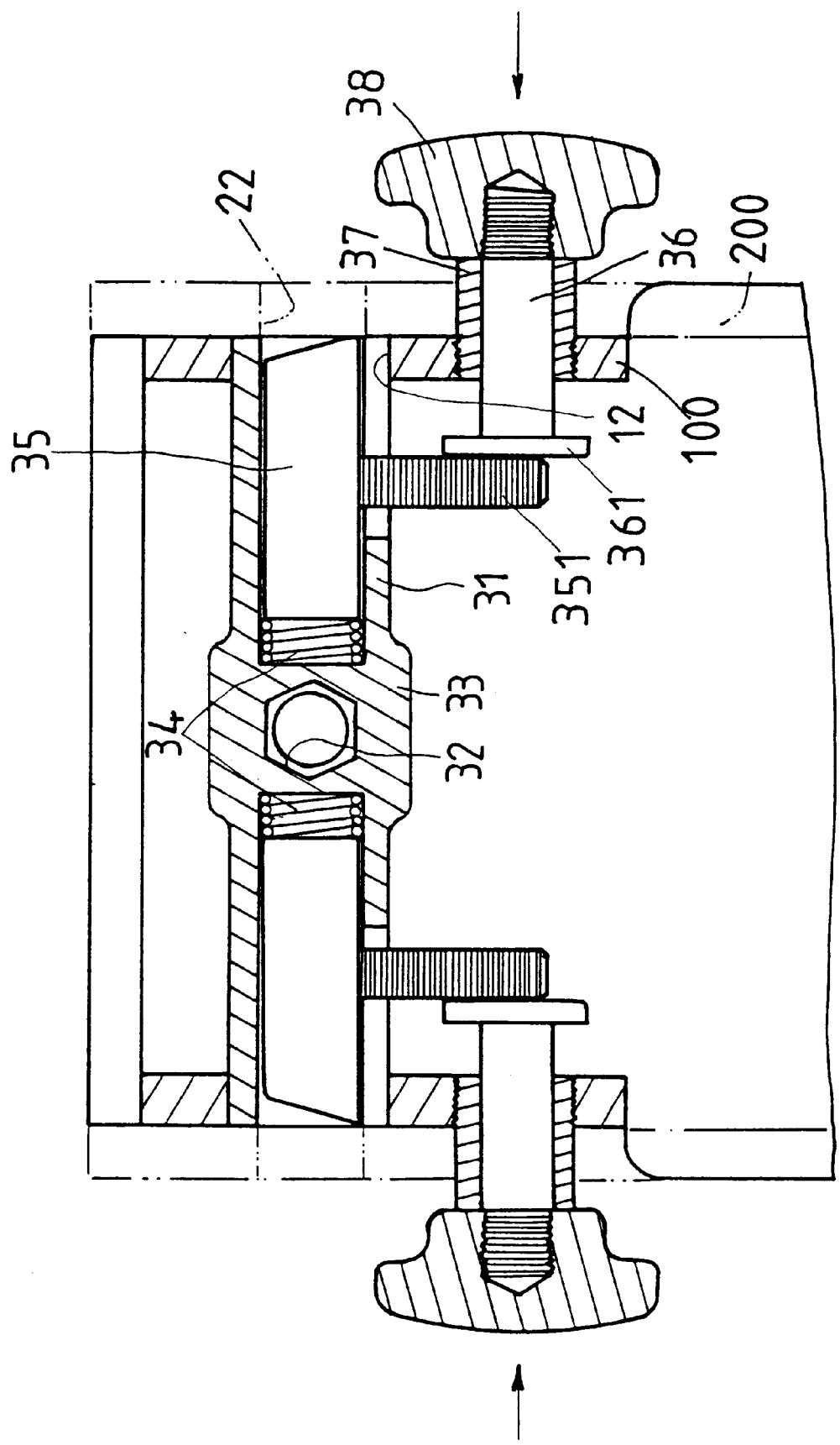
FIG. 3 is a side elevational view, partly in section, of the pivotal device in accordance with the present invention wherein the two pins are moved.
Figure 6:
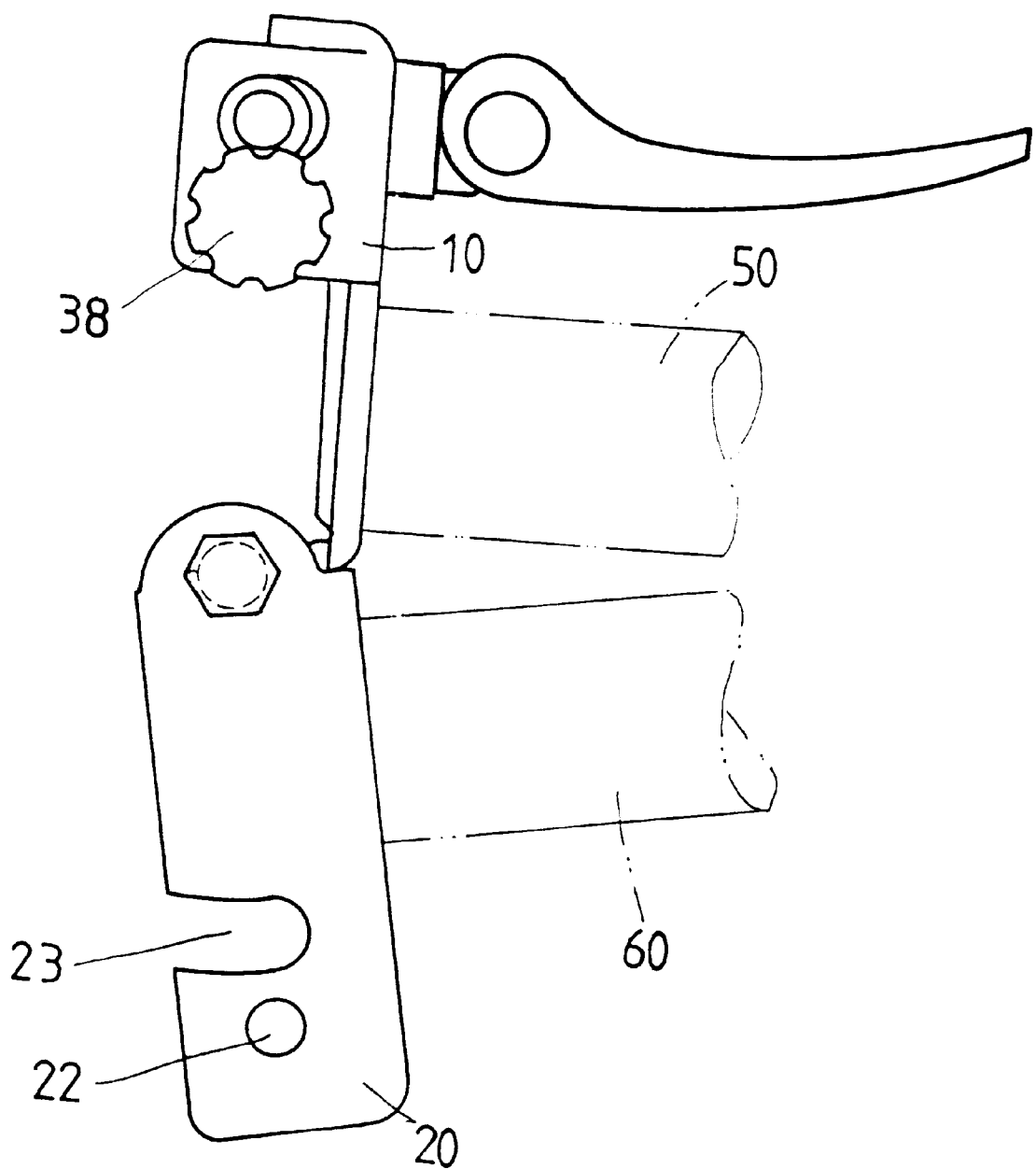
FIG. 6 is an illustrative view to illustrate the first board and the second board are pivoted away from each other.

Referring to FIG. 3, when pushing the two knobs (38) toward the clutch means (30), the two legs (351) together with the two pins (35) are moved and disengages from the two second holes (22) so that the first board (10) and the second board (20) can be pivoted away from each other as shown in FIG. 6 to fold the foldable bicycle. When releasing the two knobs (38), the springs (34) will push the two pins (35) to extend through the second holes (22).

Figure 4:
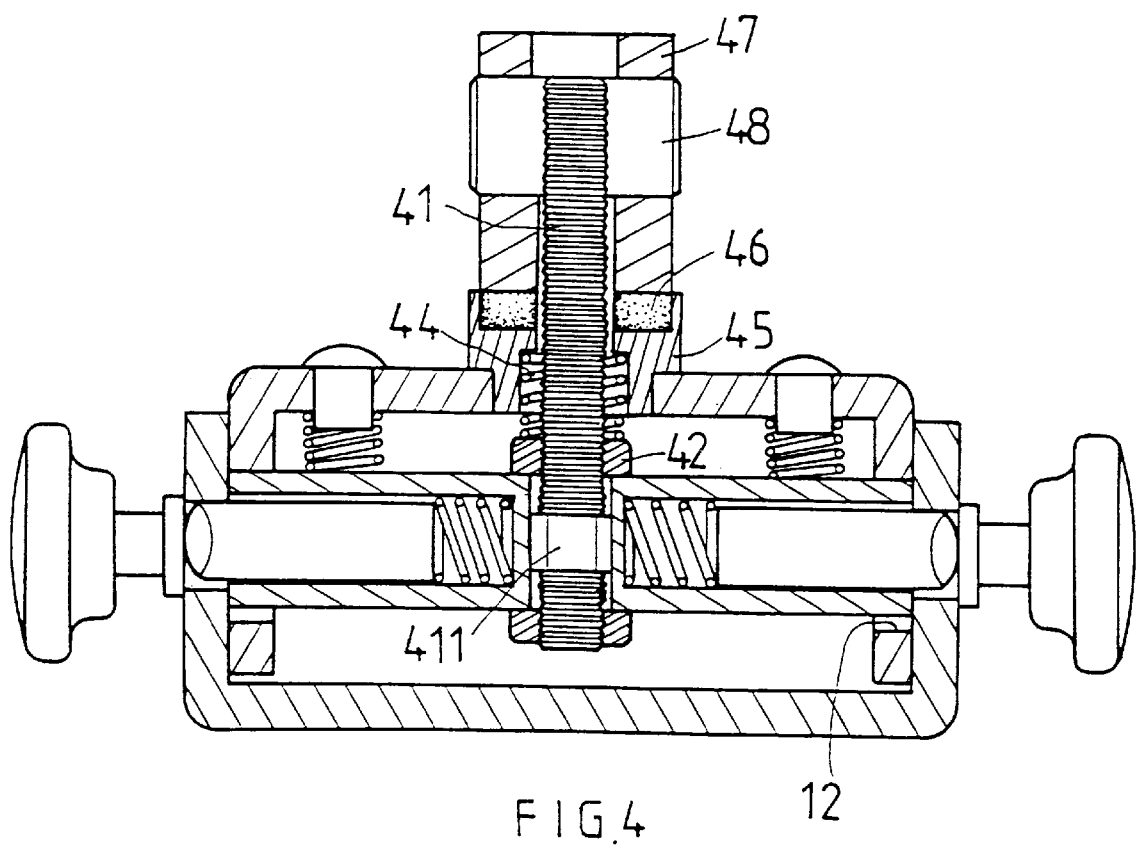
FIG. 4 is a side elevational view, partly in section, of the pivotal device in accordance with the present invention wherein the cam member is pushed.

Referring to FIG. 4, when pushing the cam member (47), the clutch means (30) is pulled together with the threaded rod (41) and the two pins (35) are moved in the slots (12). The cam member (47) is positioned because the shapes of the two lugs (471) engaged with the curved surface (462) of the frame (46). Therefore, the two boards (10, 20) will not pivoted away from each other except that the cam member (47) is pulled upwardly again.

The invention is not limited to the above embodiment but various modification thereof may be made. It will be understood by those skilled in the art that various changes in form and detail may made without departing from the scope and spirit of the present invention.

What is claimed is:

1. A pivotable device for connecting two parts of a foldable bicycle, comprising:

a first board (10) having two first side plates (100) extending from two sides thereof and said first board (10) adapted to be connected to a part (50) of a foldable bicycle, each first side plate (100) having a slot (12) defined therethrough and a pushing member (36) movably extending through each first side plate (100), a first hole (14) defined through said first board (10);

a second board (20) having two second side plates (200) extending from two sides thereof and said second board (20) adapted to be connected to another part (60) of a foldable bicycle, each second side plate (200) having a second hole (22) defined therein, said first board (10) and said second board (20) pivotally connected with each other at one of two ends of each of said first board (10) and said second board (20);

a clutch means (30) connected between said first board (10) and said second board (20), said clutch means (30) including a block (33) with two tubular members (31) extending from two ends of said block (33), each tubular member (31) having a spring (34) and a pin (35) movable received therein, each pin (35) extending through said slot (12) and said second hole (22) corresponding thereto, said two pushing members (36) contacting said two pins (35), the inner diameter of each slot (12) being larger than the outer diameter of each tubular member (31), and a secure means (40) having a rod (41) extending through said first hole (14) of said first board (10) and the first end of said rod (41) fixedly connected to said block (33), the second end of said rod (41) fixedly connected a transverse bar (48), a cam member (47) fixedly connected to said transverse bar (48).

2. The device as claimed in claim 1, wherein said block (33) has a passage 32) defined therethrough and the first end of said rod (41) is securely received in said passage (32).

3. The device as claimed in claim 2, wherein said passage (32) of said block (33) is a hexagonal passage.

4. The device as claimed in claim 3, wherein said first end of said rod (41) has threaded outer periphery which is engaged with a nut (42) connected to said block (33).

5. The device as claimed in claim 1, wherein said first board (10) has a curved plate (101) connected to the first end thereof and a tube (11) is received in said curved plate (101), said second board (20) having two lugs (201) extending from said two second side plates (200) so that said tube (11) is located between said two lugs (201), an axle (21) extending through said two lugs (201) and said tube (11).

6. The device as claimed in claim 1, wherein said first board (10) has two apertures (15) defined therethrough and each aperture (15) has a pin member (391) engaged therein, each pin member (391) having a spring (39) mounted thereto so as to contact said tubular member (31) corresponding thereto.

7. The device as claimed in claim 1, wherein each tubular member (31) has a slit (311) defined through the wall thereof and each pin (35) has a leg (351) extending radially outward therefrom, each leg (351) extending through said slit (311) corresponding thereto and contacting said pushing member (36) corresponding thereto.

8. The device as claimed in claim 1, wherein said cam member (47) is a longitudinal member and has two lugs (471) extending from one of two ends thereof, each lug (471) has an eccentric hole (4710) defined therethrough and said transverse bar (48) extending through said two eccentric hole (4710).

9. The device as claimed in claim 1, wherein each pushing member (36) is movably received in a socket (37) which extends through said first side wall (100) corresponding thereto.

10. The device as claimed in claim 1, wherein each pushing member (36) has the first end thereof a disk (361) connected thereto which contacts said pin (35) corresponding thereto, the second end of each pushing member (36) connected to a knob (38) which is located on the outside of said first side wall (100) corresponding thereto.

11. The device as claimed in claim 1, wherein each second side plates (200) has a notch (23) defined therein so as to receive said pushing members (36) when said first board (10) and said second board (20) are connected together.

* * * * *